United States Patent [19]
Isaki

[11] 4,442,466
[45] Apr. 10, 1984

[54] HEAD DRIVE MECHANISM FOR A CASSETTE DECK
[75] Inventor: Mikio Isaki, Saitama, Japan
[73] Assignee: Pioneer Electronic Corporation, Tokyo, Japan
[21] Appl. No.: 350,484
[22] Filed: Feb. 19, 1982
[30] Foreign Application Priority Data Feb. 20, 1981 [JP] Japan .................. 56-24714
Feb. 20, 1981 [JP] Japan .................. 56-24715

[51] Int. Cl.³ .................. G11B 5/54; G11B 21/02
[52] U.S. Cl. .................. 360/75; 360/105
[58] Field of Search .................. 360/75, 105
[56] References Cited

U.S. PATENT DOCUMENTS

| | | | |
|---|---|---|---|
| 3,716,242 | 2/1973 | Maruyama | 274/4 D |
| 3,809,827 | 5/1974 | Oyaba | 360/106 |
| 3,860,963 | 1/1975 | Ueda | 360/92 |
| 3,869,722 | 3/1975 | Iwasaki | 360/92 |
| 3,883,893 | 5/1975 | Ueki et al. | 360/74 |
| 3,932,890 | 1/1976 | Ueki et al. | 360/75 |
| 3,936,877 | 2/1976 | Maruyama et al. | 360/96 |
| 4,214,283 | 7/1980 | Fushimi et al. | 360/71 |
| 4,219,852 | 8/1980 | Magata et al. | 360/90 |

*Primary Examiner*—George G. Stellar
*Attorney, Agent, or Firm*—Sughrue, Mion, Zinn, Macpeak and Seas

[57] ABSTRACT

A head drive mechanism for a cassette deck includes a reciprocating member driven when the reels are halted and a lever member for driving the head. Connecting these two members is an operating mechanism, which may include a lever member and an elastic member for elastic connection. The head is locked after it advances a certain distance, and is then unlocked to move quickly to the forward position to contact the tape.

15 Claims, 34 Drawing Figures

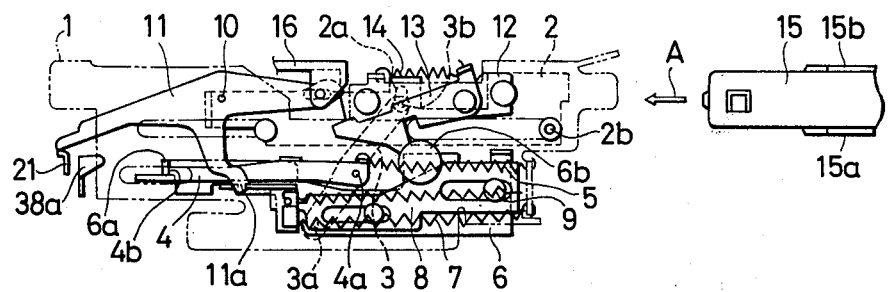
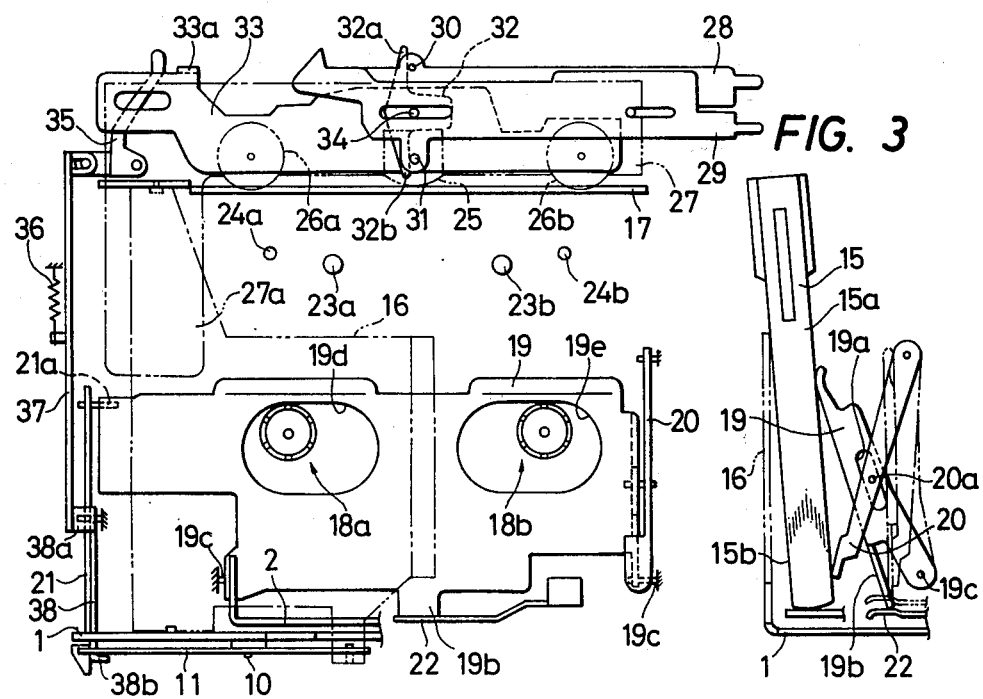

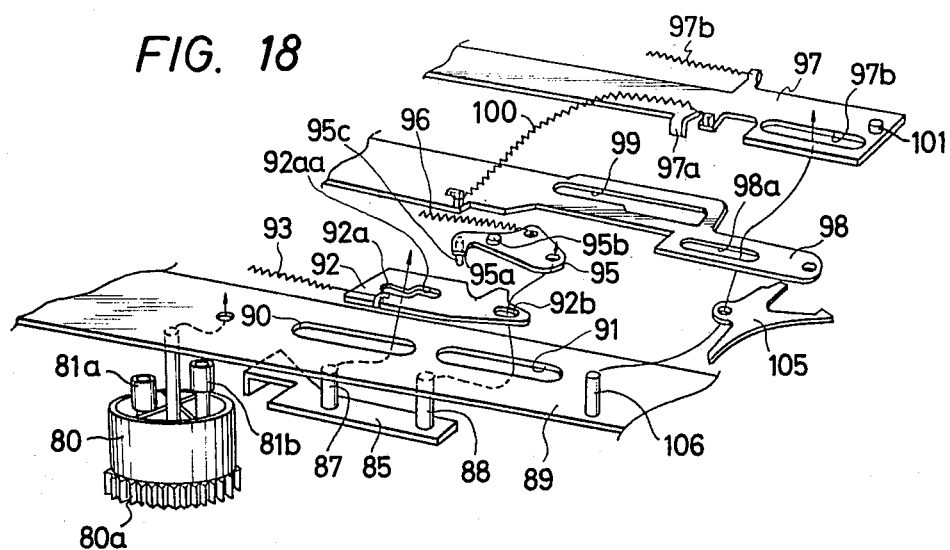
FIG. 18
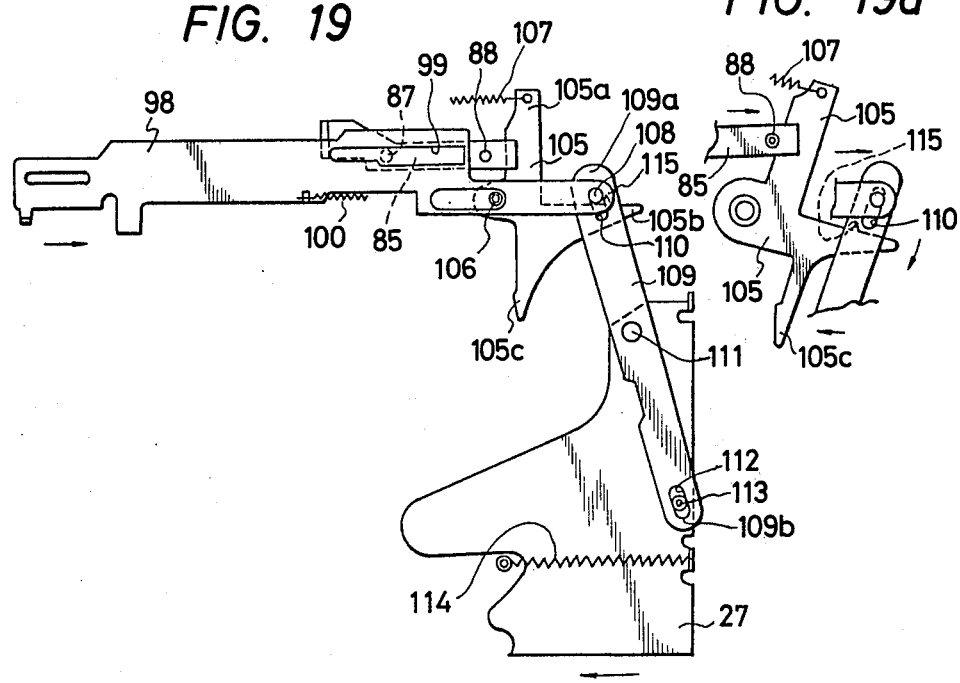
FIG. 19
FIG. 19a

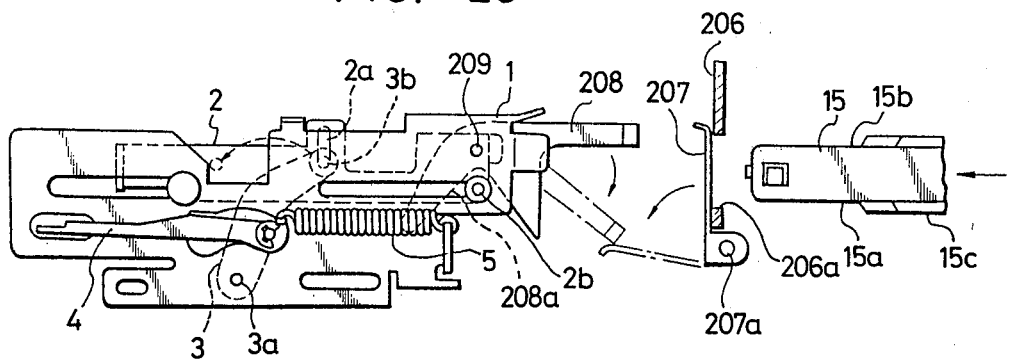
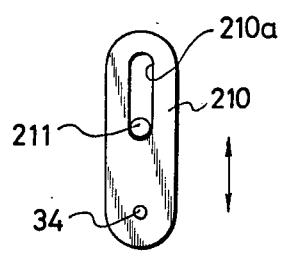
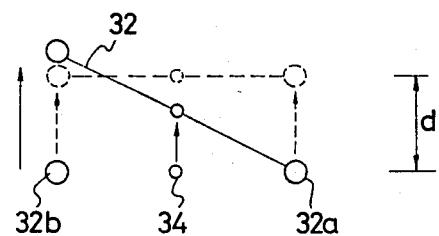

HEAD DRIVE MECHANISM FOR A CASSETTE DECK

BACKGROUND OF THE INVENTION

This invention relates to cassette decks, and more particularly to a head drive mechanism for a cassette deck.

A cassette deck having an automatic playback function and an automatic tape stretching function (ATS) is designed so that when a cassette is loaded therein only the winding reel is turned to stretch the tape tight. It is detected from the stoppage of the winding reel that the tape has been stretched tight, and the head may be advanced to perform the playback operation.

In order to carry out the above-described operation, a head drive mechanism is sometimes provided which has a movable member which, when the rotation of the reel unit is stopped, is reciprocated by the drive of a drive motor which is a drive source for the reel unit, the movable member being engaged with a head drive lever to advance the head.

In such a case, the speed of advancement of the head is lower than in the case when the head is advanced by a solenoid, and therefore the timing of the abutment of the pinch roller against the capstan due to the advancement of the head is not always coincident with the timing of the release of the ratchet mechanism of the supply reel. Therefore, the tape is sometimes twined around the capstan, or it is difficult to accurately search the data recorded at the beginning of the tape.

SUMMARY OF THE INVENTION

Accordingly, an object of this invention is to provide a novel head drive mechanism in which the above-described difficulties accompanying a conventional head drive mechanism have been eliminated.

The head drive mechanism according to the invention is designed so that the movement of a movable member, which, when the rotation of a reel unit is stopped, is reciprocated by the drive of a reel drive motor, is transmitted through an elastic member to a head drive lever, when the head is advanced a predetermined distance the head is locked once, and when the movable member is further reciprocated, the head is unlocked, so that the head is quickly advanced by the restoring force of the elastic member.

BRIEF DESCRIPTION OF THE DRAWINGS

FIG. 1 is a schematic side view of a cassette insertion, holding and ejecting mechanism, as an example according to the present invention;

FIG. 2 is a plan view of the mechanism shown in FIG. 1;

FIG. 3 is a schematic side view of the mechanism shown in FIG. 1;

FIG. 18 is a perspective view showing the arrangement of the sensing power gear and the key off lock lever;

FIG. 19 is a diagram for describing the operation of the head with FIG. 19a showing the rotated position of the retaining arm 105;

FIG. 28 is a side view illustrating one example of a door retaining mechanism;

FIG. 29 is a front view of a control lever arranged parallel to the rewind and fast forward levers; and FIG. 30 is a diagram for describing the operation of the operating mechanism.

DETAILED DESCRIPTON OF THE INVENTION

Figure 4:
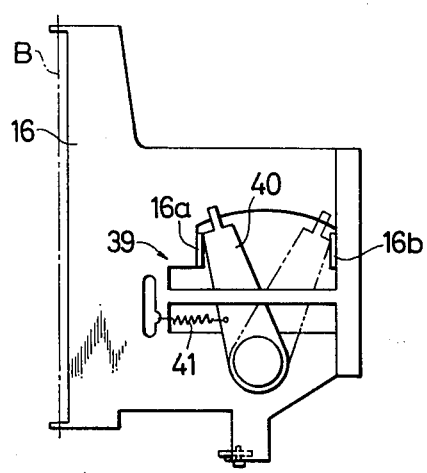
FIG. 4 is a plan view of the cassette holder shown in FIG. 2.

FIG. 1 is a schematic side view of one example of a cassette mounting, retaining and ejecting mechanism according to the present invention. FIG. 2 is a schematic plan view thereof and FIG. 3 is a schematic frontal view thereof. In the figures, a cassette push lever 2 is slidably engaged with a side frame 1 in the horizontal direction and a first arm 3 is rotatably supported about a shaft 3a fixed to the side frame 1. The first arm 3 is engaged, at a pin 3b formed at its end, with a long vertical slot 2a formed in the cassette push lever 2. The first arm 3 is rotated by the leftward movement of the cassette push lever 2 along with the movement of a cassette 15 in a direction indicated by the arrow A. The end portion of the lever 2 is substantially L-shaped, as best seen in FIG. 2, so that the end of the cassette 15 may abut the L-shaped end portion. A first lever 4 is rotatably supported by a shaft 4a to the first arm 3. The first lever 4 is moved in the horizontal direction in FIG. 1, that is, in the cassette insertion direction, by the rotation of the first arm 3. Upon movement, the first lever 4 is biased in the rightward direction in FIG. 1 against the side frame 1 by a spring 5.

A second lever 6 is slidably engaged with the side frame 1 in the cassette insertion and eject directions. Upon the movement of the first lever 4 in the leftward direction, a projection 6a formed on an end portion of the second lever 6 is engaged with a projection 4b formed on the first lever 4 so that the second lever 6 is moved in the cassette insertion direction as well as the first lever 4, during which the second lever 6 is biased in the opposite direction, i.e., in the cassette eject direction by a spring 7 interposed between the second lever 6 and the side frame 1.

A third lever 8 is slidably mounted on the second lever 6 and is biased by a spring 9 to the cassette insertion direction with respect to the second lever 6. The third lever 8 is engaged at its end 8a with one end 11a of a rotational arm 11 rotatably supported about a shaft 10 fixed to the side frame 1, thereby urging the rotational arm 11 in the clockwise direction with the assistance of the spring 9.

On a fourth lever 12, movable from a position shown in FIG. 1 in the rightward direction with respect to the side frame 1, is rotatably mounted a fifth lever 13, an end of which is provided with a spring 14 laid around the side frame 1, whereby the fourth lever 12 is biased in the cassette insertion direction and the fifth lever 13 is biased in the counterclockwise direction in FIG. 1. A slanted surface of the fifth lever 13 is engaged with a pin 6b formed on the second lever 6. The second lever 6 is moved in the cassette insertion direction in cooperation with the movement of the cassette push lever 2 upon insertion of the cassette 15 so that the fifth lever 13 is rotated in the counterclockwise direction. Then, when the cassette 15 is fully inserted, a concave portion of the fifth leve 13 is engaged with a pin 2b formed on the cassette push lever 2, thereby locking the cassette push lever 2.

The cassette holder 16 is of substantially rectangular shape and is rotatably supported by the side frame 1 and another side frame 17 about an axis indicated by a line B shown in FIG. 4. An end portion of the cassette holder 16 is engaged with an end of the rotational arm 11. The rotational movement of the cassette holder 16 is prevented by the engagement thereof with the left end of the fourth lever 12. When the cassette 15 is fully inserted, that is, when the pin 2b of the cassette push lever 2 is locked by the fifth lever 13, under the force of the springs 5 and 7 acting on the pin 2b, the fourth lever 12 is moved somewhat in the rightward direction through the fifth lever 13 to thereby allow rotational movement of the cassette holder 16. Thus, the cassette holder 16 is rotated in the clock-wise direction under the biasing force acting on the rotational arm 11 to thereby lower the fully inserted cassette 15 to the tape play position. At this time, the reel holes (not shown) of the cassette 15 are engaged with reel units 18a and 18b.

When the cassette 15 is inserted, a lower primary surface 15a thereof shown in FIG. 1, which is substantially in the form of a rectangular plate, is supported by a cassette support plate 19 rotatable around a support axis 19c, and an auxiliary arm 20 as shown in FIG. 3 whereas the other surface, that is, the upper primary surface 15b of the cassette 15 is held by the cassette holder 16. The cassette support plate 19 has a pair of holes 19d and 19e which are engageable with the reel units 18a and 18b for the cassette 15. The rotational axes of the cassette holder 16 and the cassette support plate 19 are perpendicular to the up-and-down direction of the cassette 15 and are preferably perpendicular to each other and separated by a predetermined distance. That is, the free edges of the cassette holder 16 and the cassette support plate 19 are arranged so as to intersect each other in the vicinity of the center of the cassette 15 which is inserted to a position where the cassette 15 is engageable with the reel units 18a and 18b, and the cassette holder 16 and the cassette support plate 19 are adapted to clamp the cassette 15 therebetween. The cassette support plate 19 is freely rotatable about the support axis 19c fixed to an under-frame (not shown) and is engaged with the rear end of the rotational arm 11 through a lift arm 21 mounted rotatably on a rear frame (not shown) so that the cassette support plate 19 may be held at the position shown in FIG. 3.

During the downward movement of the cassette 15, the cassette holder 16 and the cassette support plate 19 serve to clamp the cassette 15 and are lowered in association with the movement of the rotational arm 11 to thereby allow the cassette 15 to be lowered and mounted on the reel units 18a and 18b. In order to ensure the support of the cassette 15, the above described auxiliary arm 20 is freely rotatably mounted on the upper frame and is engaged with a slot 19a formed in the cassette support plate 19 through a pin 20a so that when the cassette 15 is mounted on the reel units 18a and 18b, the auxiliary arm 20 is lowered in a collapsible manner with the cassette support plate 19 as shown by the dot and chain line in FIG. 3.

The cassette 15 mounted on the reel shafts 18a and 18b is spring-biased in the direction of the magnetic head, as described in more detail later, by a cassette push spring 22 (shown in FIG. 3). The cassette push spring 22 is pressed by the rear end 19b of the cassette support plate 19 in order to not prevent the downward motion of the cassette 15, so that the spring 22 is positioned so as to deviate from the lowering path of the cassette. The cassette push spring 22 is gradually advanced as the rear end 19b of the cassette support plate 19 is rotated around the support axis 19c during the downward movement of the cassette 15, thereby biasing the cassette 15 in the opposite direction.

In FIG. 2, reference characters 23a, 23b and 24a, 24b denote guide pins and capstans, respectively, which are engageable with holes formed in the cassette 15. A head 25 and a head plate 27 on which pinch rollers 26a and 26b are mounted are movable in the vertical direction and are driven by a device (not shown) when the tape recorder is in the reproduction mode (PLAY) or during a recording interval, thereby moving from the position shown in FIG. 2 forwardly. With this movement, the magnetic head 25 is pressed against the tape, and at the same time the pinch rollers 26a and 26b made of rubber or the like are allowed to pressingly contact against the capstans 24a and 24b in accordance with the tape travelling direction. At the position where the head plate (or simply "head") is advanced, the end portion 27a thereof is positioned above a pin 21a formed at an end of the lift arm 21 so that the rotation of the lift arm 21 is limited to thereby prevent cassette ejection.

Reference numerals 28 and 29 denote an FF lever for fast forward operation and REW lever for tape rewind, respectively, which are slidable with respect to the side frame 17. On the FF lever 28 and the REW lever 29 are fixed pins 30 and 31 which are engaged with engagement ends 32a and 32b of a second arm 32, respectively. The second arm 32 is mounted on a pin 34 fixed to a first cam 33 which is slidable with respect to the side frame 17. It should be noted that when the FF and REW levers 28 and 29 are independently depressed, they act as command levers for the FF and REW operations, but when the two levers 28 and 29 are depressed simultaneously, they are adapted to cooperate with one other to carry out the cassette ejection (EJECT). Namely, when the levers are depressed at the same time, the movement of the pin 34 is twice that when the buttons are independently depressed. On the basis of this difference in movement, the eject operation may be achieved.

The movement of the pin 34 is equal to the movement of the first cam 33. In compliance with the simultaneous depression of the FF lever 28 and the REW lever 29 for the eject operation, the first cam 33 is moved by a predetermined distance to the left in the figure, causing a protuberance 33a to abut the end of a third arm 35 which is freely rotatable, thereby allowing the third arm to rotate in the counterclockwise direction. The other end of the third arm 35 is engaged with an end 38a of a rotatable lock release lever 38 through a connection lever 37 biased upwardly by a spring 36. The other end 38b of the lock release lever 38 is moved downwardly (in FIG. 1) by the eject operation. The end protuberance of the first lever 4, which has come to an engageable position with the other end 38b of the lock release lever 38 in the cassette mounting position, is lowered to thereby release the locking.

FIG. 4 is a plan view of the cassette holder 16. The cassette holder 16 is provided with a cassette pull-out preventing mechanism 39. The cassette pull-out preventing mechanism 39 serves to prevent the cassette 15 from popping out of the insertion opening during the eject operation, and is composed of a stopping arm 40 acting as an engagement member and being rotatable along the primary surface of the cassette holder 16, and a spring which is adapted to bias the stopping arm 40 in the counterclockwise direction. The stopping arm 40 has at its lower surface a projection (not shown) engageable with the reel hole which engages with the reel unit 18a (shown in FIG. 2) of the cassette 15, and is limited in its rotation by a pair of projections 16a and 16b formed on the cassette holder 16. One of the projections 16a and 16b is engaged with the reel hole when the cassette 15 is fully inserted in the cassette insertion operation. Also, the projection of the stopping arm 40 is engaged with the above described reel hole of the cassette 15 as lifted by the cassette support plate 19 in the eject operation, and the stopping arm 40 rotates in cooperation with the jumping of the cassette 15 and abuts against the stopping projection 16b, to thereby hold the cassette 15 in that position.

The above described operation will now be described in more detail with reference to FIGS. 5 to 11.

Figure 5:
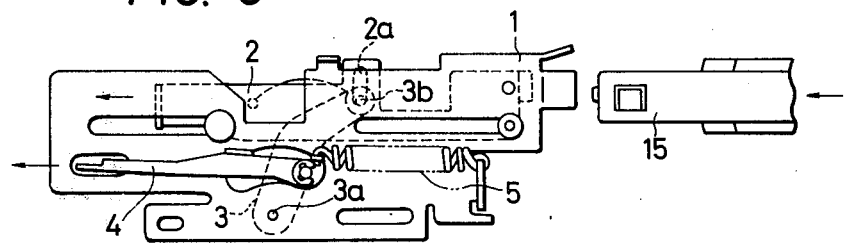
FIGS. 5 to 11 are views illustrating the operation of the mechanism shown in FIGS. 1 to 3.
Figure 6:
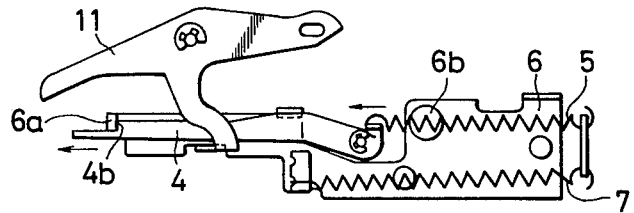
Figure 7:
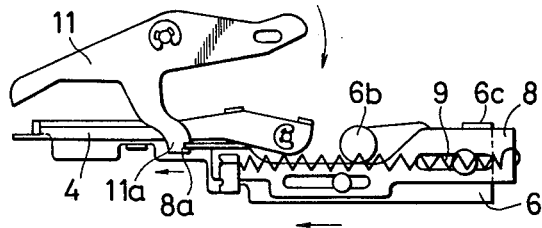

First of all, in cassette insertion, the cassette 15 is in abutment with an L-shaped end portion of the cassette push lever 2 at its end, to allow the cassette push lever 2 to move in a direction indicated by the arrow in FIG. 5. With this movement of the cassette push lever 2, the first arm 3 is movably rotated in the counterclockwise direction to allow the first lever 4 to move in the direction indicated by the arrow. At this time, the spring 5 is made to extend. As shown in FIG. 6, the first lever 4 allows the second lever 6 to move in the direction indicated by the arrow, with the engagement between the end projection 4b and the projection 6a of the second lever 6. At this time, the second lever 6 causes the spring 7 to extend and at the same time attracts the third lever 8 through the spring 9 as shown in FIG. 7. For this reason, the rotational arm 11, which is engaged at one end 11a with the end portion 8a of the third lever 8, is biased in the clockwise direction by the spring 9. The biasing force of the spring 9 is a force depressing the cassette 15 when the inserted cassette is lowered.

Figure 8:
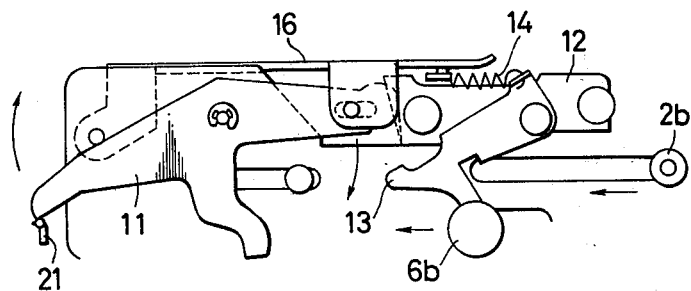

In compliance with movement of the cassette push lever 2, the pin 2b fixed thereto is moved, and at the same time the pin 6b fixed to the second lever 6 is moved in the direction shown in FIG. 8. Accordingly, the fifth lever 13 biased by the spring 14 is rotated in the counterclockwise direction, and when the cassette 15 is fully inserted, the concave portion serves to lock the pin 2b. The forces of the springs 5 and 7 are applied to the pin 2b, and the fourth lever 12 is somewhat moved in the rightward direction through the fifth lever 13. By the movement of the fourth lever 12, the engagement between the leftward end of the fourth lever 12 and the cassette holder 16 is released. The cassette holder 16, which is prevented from rotating until this time, is rotated in the clockwise direction so that the cassette 15 is depressed downwardly. At this time, the cassette support plate 19 and the auxiliary arm 20 (shown in FIG. 3), which are prevented from rotating until this time by the engagement with the rear end of the rotational arm 11 via the lift arm 21, are now rotated, to cooperate with the cassette holder 16 while clamping the cassette 15 and lowering it, as a result of which the cassette 15 is set on the reel units 18a and 18b. The cassette 15 set on the reel units 18a and 18b is spring-biased in the direction toward the head 25 by the cassette push spring 22.

Figure 9:
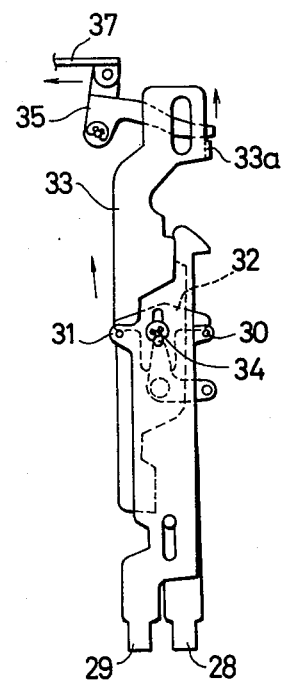
Figure 10:
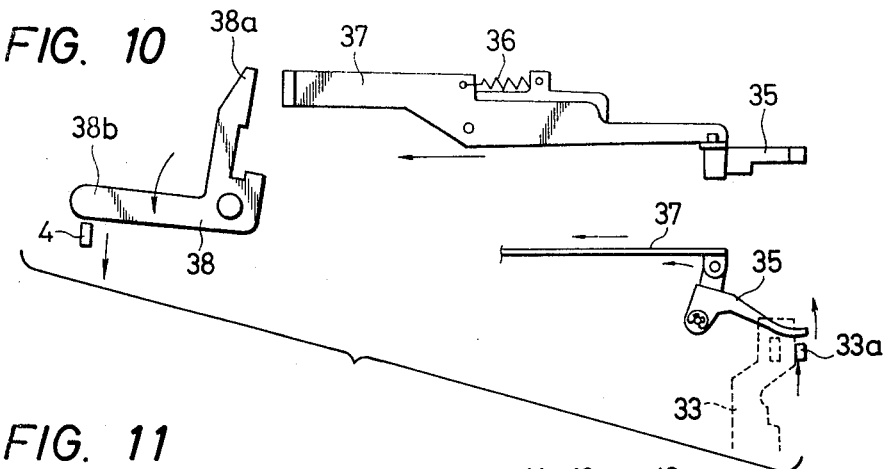

In the eject operation, the FF lever 28 and the REW lever 29 are simultaneously depressed so that the second arm 32 is pushed by the two pins 30 and 31 fixed to each lever to thereby move the pin 34 twice the distance moved when either the FF or REW buttons are operated separately. Thus, the first cam 33, as shown in FIG. 9, is moved in the direction indicated by the arrow and the projection 33a abuts an end of the third arm 35 so that the arm 35 is rotated in the counterclockwise direction. By the rotation of the third arm 35 the connection lever 37 is moved in the leftward direction as shown in FIG. 10 so that the lock release lever 38 is rotated in the counterclockwise direction.

Figure 11:
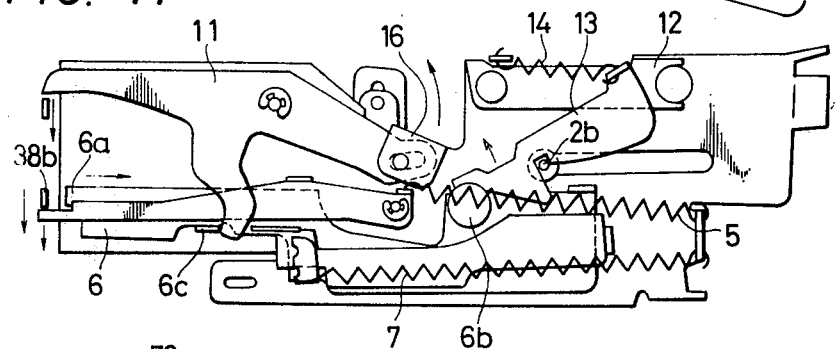

As shown in FIG. 11, the lock release lever 38 serves to release the engagement between the projection 4b of the first lever 4 and the projection 6b of the second lever 6 by the lowering movement of the end portion of the first lever 4. Then, the second lever 6 is moved in the rightward direction and the projection 6c of the second lever 6 is engaged with the end of the rotational arm 11 whereby the rotational arm 11 is rotated in the counterclockwise direction. By the movement of the rotational arm 11, the cassette holder 16, the cassette support plate 19 and the auxiliary arm 20 are adapted to lift the cassette 15 while clamping it. Also, when the cassette 15 is lifted upwardly, the fifth lever 13 is rotated in the clockwise direction by the rightward movement of the pin 6b of the second lever 6 engaged with the slant surface of fifth lever 13. An the time when the lift movement of the cassette 15 is completed, the lock of the pin 2b fixed to the cassette push lever 2 is released. Therefore, the cassette push lever 2 is moved in the rightward direction to thereby eject the cassette 15. The force required to lift and eject the cassette 15 in this operation is derived from the spring force of the springs which are extended when the cassette is mounted.

Figure 12:
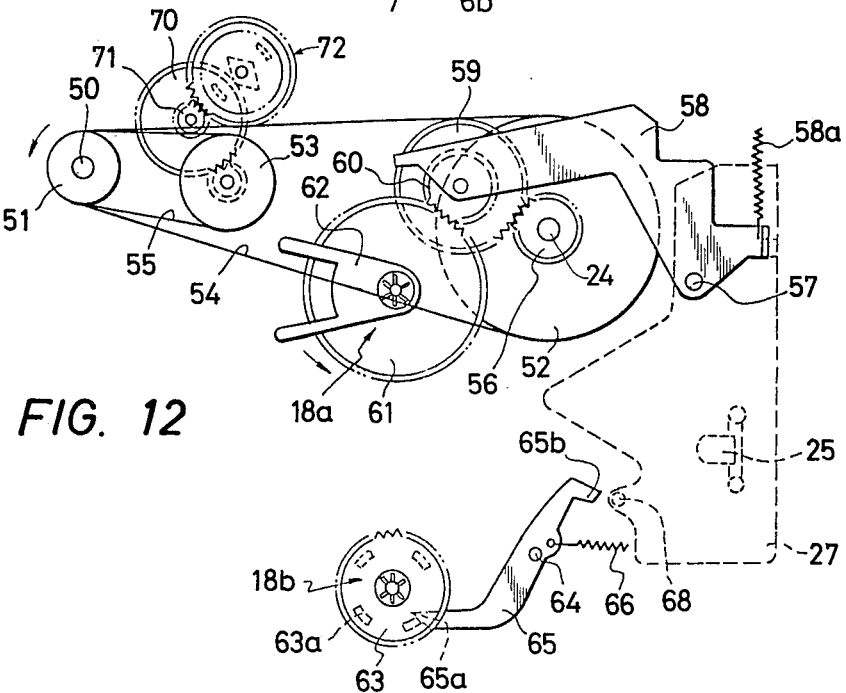
FIG. 12 is a diagram showing the arrangement of the drive motor and drive gears.

FIG. 12 shows a reel unit drive mechanism employed in the cassette deck according to the invention. In the drive mechanism, an endless belt 54 is laid over the first pulley of a dual pulley 51 and a flywheel 52, and an other endless belt 55 is laid over the second pulley of the dual pulley 51 and a pulley 53. The dual pulley is coupled to the rotary shaft 50 of a motor (not shown). The shaft of the flywheel 52 is a capstan 24. A gear 56 is provided integrally and coaxially with the flywheel 52. The gear 56 can engage an idler gear 59 which is rotatably mounted on one end portion of an arm 58 which is pivotally mounted on a pivot pin 57 embedded in the lower chassis (not shown) and is urged in the direction of the arrow by a spring 58a. An idler gear 60, which is integral and coaxial with the idler gear 59, can engage a reel unit drive gear 61 integral with a reel unit 18a. The reel unit 18a has a sensing releasing arm 62 which is engaged with the reel unit drive gear through a member of predetermined friction. A drive reel unit 18b includes a ratchet gear 63 having a plurality of locking pawls 63a. A ratchet arm 65, which is pivotally mounted on a pivot pin 64 embedded in the lower chassis, is urged clockwise by a spring 66, so as to engage a locking pawl 63 at one end portion 65a, thus forming a ratchet mechanism. The other end portion 65b of the ratchet arm 65 may abut against a pin 68 embedded in a head member 27. Therefore, as the head 27 is moved to its forward position, the end portion 65b is turned counterclockwise, thus releasing the ratchet mechanism. In other words, when the head 27 is at its rearward position (or when it is retracted) the ratchet gear 63 can turn clockwise only, and when the head 27 is at the forward position the ratchet gear 63 can turn both clockwise and counterclockwise. A gear 69 integral with the pulley 53 is engaged through an idler gear 70 to a planet gear unit 72.

Figure 13:
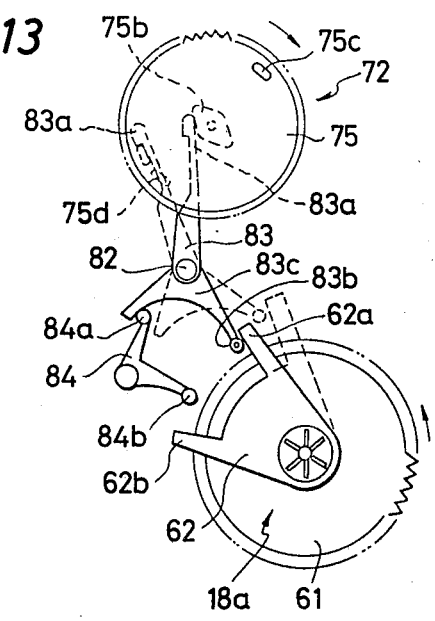
FIGS. 13 and 14 are diagrams illustrating the arrangement of a planetary gear unit.
Figure 14:
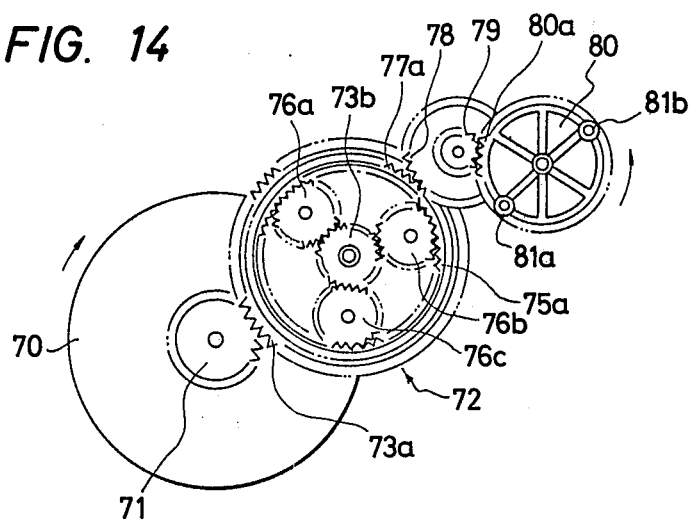
Figure 15:
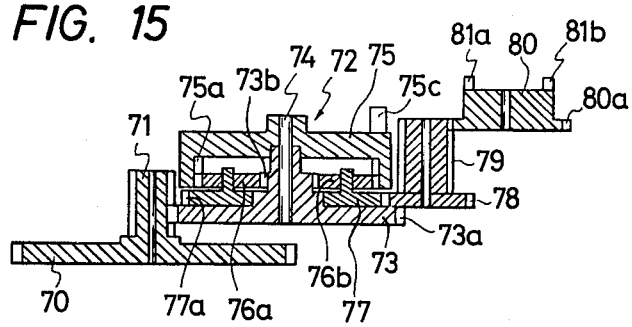
FIG. 15 is a sectional view of the planetary gear unit and associated gears engaged therewith.

As shown in FIGS. 13 through 15, the substantially conical drive gear member 73 of the planet gear unit 72 has a drive gear 73a which is engaged with the idler gear 71, so that torque is transmitted through the idler gear 71 to the planet gear unit 72. A shaft 74 is inserted into the central hole of the drive gear member 73 and fixedly secured to the drive gear member 73. A sun gear 73b is cut in the upper portion of the drive gear member 73. An internal gear member 75 with an internal gear 75a is coupled to the top portion of the drive gear member 73. Three pinion gears 76a, 76b and 76c are provided between the integral gear 75a and the sun gear 73b is such a manner that the pinion gears are engaged with the gears 75a and 73b. The pinion gears 76a, 76b and 76c are rotatably mounted on a carrier member 77 which is rotatably engaged with the drive gear member 73. The peripheral portion of the carrier member 77 is formed into a carrier gear 77a which is engaged with an idler gear 78. The idler gear 78 is integral and coaxial with an idler gear 79 which is engaged with the gear 80a of a power sensing gear member 80. A pair of rollers 81a and 81b are rotatably mounted on the periphery of the power sensing gear member 80.

As is apparent from FIG. 13, the central portion of the internal gear member 75 is formed into a cam 75b, and a pair of pins 75c and 75d are embedded in the peripheral portion of the internal gear member 75. The cam 75b can engage one end portion 83a of a Y-shaped arm 83 which is pivotally mounted on a pivot pin 82. Another end portion 83b of the Y-shaped arm 83 is engaged with a protrusion 62a of the sensing releasing arm 62. One end portion 84a of a Y-shaped arm 84 is engaged with the curved recess 83c of the Y-shaped arm 83, and the other end portion 84b can engage another protrusion 62b of the sensing releasing arm 62.

Figure 16:
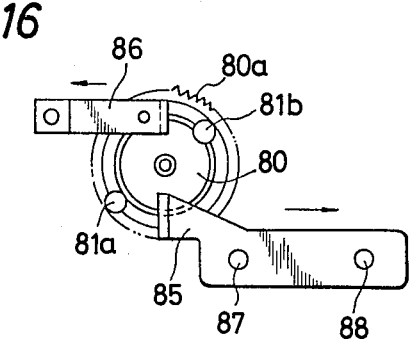
FIG. 16 is a diagram depicting the arrangement of a sensing power gear and slide members.
Figure 17:
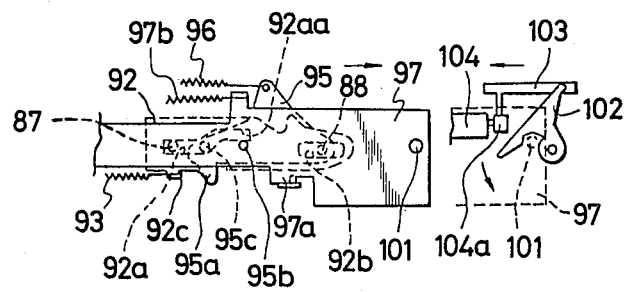
FIG. 17 is a diagram for describing the operation of a key off lock lever.

As shown in FIG. 16, the pair of rollers 81a and 81b provided on the power sensing gear member 80 can engage a pair of slide members 85 and 86, respectively. When the magnetic tape has been stretched tight, or when the internal gear member 80 is turned in the direction of the arrow in detecting the tape end, the slide members 85 and 86 are pushed in the directions of the arrows, respectively. The slide member 86 is engaged with an automatic ejection mechanism (described later). A pair of pins 87 and 88 are embedded in the slider member 85 and are inserted into elongated holes 90 and 91 formed in a chassis member 89 which is coupled to the lower chassis (not shown), as shown in FIGS. 17 and 18. Furthermore, the pin 87 is inserted into a cam hole 92a in a latch lever 92, while the pin 88 is inserted into an elongated hole 92b in the latch lever. The latch lever 92 has a protruding end portion 92c which is urged in a direction opposite to the head 27 by a spring 93. A locking lever 95 is pivotally mounted on the end of the pin 88 and is urged counterclockwise by a spring 96. The locking lever 95 has a locking pawl 95a which can engage with the locking pawl 97a of a key off lock lever 97. The key off lock lever 97 is urged in a direction opposite to the head 27 by a spring 97b. A pin 95a is embedded in the upper surface (as viewed in the figure) of the central portion of the locking lever 95, and is inserted into a cam hole 99 formed in a head drive lever 98. A pin 95c is embedded in the lower surface of the locking lever 95, and is inserted into a cam hole 92aa formed in the latch lever 92. The key off lock lever 97 and the head driver lever 98 are movable in parallel with the head 27 and are coupled together by a spring 100. A lock pin 101 is embedded in the end portion of the key off lock lever 97, which is closer to the head 27. The lock pin 101 is engaged with the locking lever 95 through the locking pawls 95a and 97a to move towards the head, so that when the forward movement of the head has been accomplished the lock pin 101 is engaged with a key off lock arm 102. The key off lock arm 102 is urged through a suitable link member 103 by the plunger 104a of a key off solenoid 104 in the direction of the arrow. The key off lock lever 97 is locked by the key off lock arm 102 as long as the key off solenoid 104 is energized with a cassette loaded. A head pulling and retaining arm is pivotally mounted on a pivot pin 106 which is embedded in the chassis member 89. The pin 106 is inserted into the elongated hole 98a of the head drive lever 98 and the elongaged hole 97b of the key off lock lever 97, to guide the head drive lever 98 and the key off lock lever 97.

As shown in FIG. 17, the head pulling and retaining arm 105 has one end portion 105a which is urged counterclockwise by a spring 107. A pin 108 is embedded in an end portion of the head drive lever 98, which is closer to the head. The pin 108 is extended towards the rear side of the figure, so that it is inserted into an elongated hole 110 formed in an end portion 109a of a head forwarding arm 109. The arm 109 is pivotally mounted on a pivot pin 111 embedded in the chassis member 89. An elongated hole 112 is cut in the opposite end portion 109b of the arm 109. A shaft 113 embedded in the head 27 is inserted into the elongated hole 112. The head 27 is urged by a spring 114, in the direction of head advancement, with respect to the lower chassis.

The head stand pulling and retaining arm 105 has a locking pawl 115 at the end portion 105b, which can engage the pin 108. The end portion 105a of the arm 105 can abut against the pin 88 on the slide member 85. When the slide member 85 is moved more than a predetermined distance in the right-hand direction in the figure by the roller 81a, the head pulling and retaining arm 105 is turned clockwise as shown in FIG. 19a, and the pin 108 is disengaged from the locking pawl 115.

Figure 20:
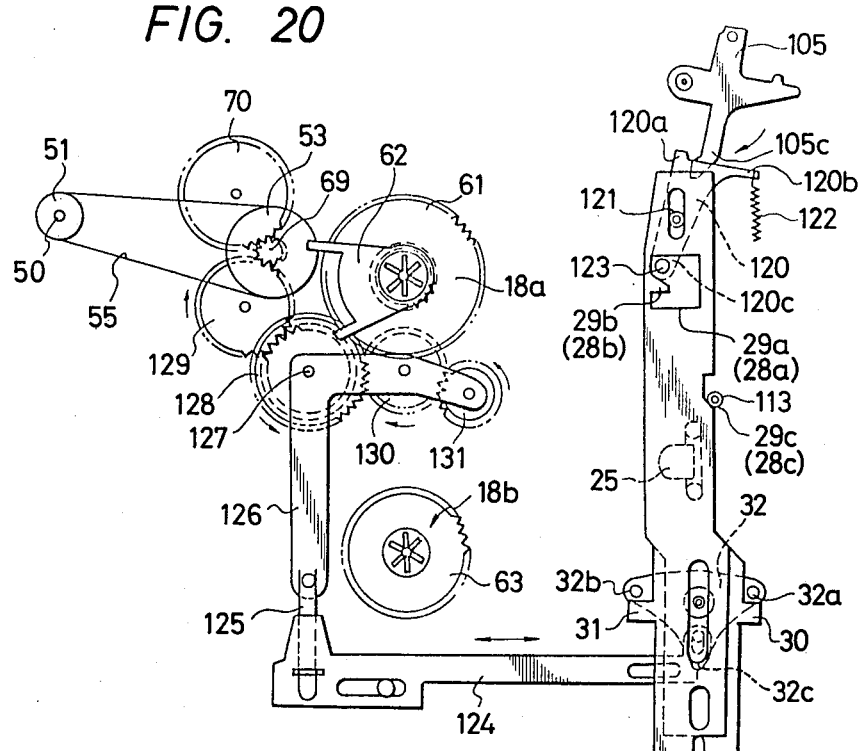
FIG. 20 is a diagram showing the arrangement of a FF lever, REW lever and associated drive gears.

As is best shown in FIG. 20, one end portion 105c of the head pulling and retaining arm 105 can engage one end portion 120a of a lock arm 120 for the FF lever 28 and the REW lever 29 (described later). The lock arm 120 is pivotally mounted on a pin 121 embedded in the chassis member 89. A spring 122 is connected under tension between a protruded end portion 120b of the lock arm 120 and the head forwarding arm 109, to urge the lock arm 120 clockwise. A roller 123 is rotatably mounted on one end portion 120c of the lock arm 120, and is inserted into windows 28a and 29a formed in the FF and REW levers 28 and 29. The windows 28a and 29a have protrusions 28b and 29b, respectively. When one of the FF lever 28 and REW lever 29 is operated, the respective protrusion is engaged with the roller 123. The FF lever 28 and the REW lever 29 have cams 28c and 29c which are engaged with a pin 113 embedded in the head stand 27.

The locking portion 32c of a second arm 32 is engaged with one end portion of a relay lever 124 which is movable in the head movement direction. One end portion of an L-shaped lever 126 is engaged through a pin member 125 with the other end portion of the relay lever 124. The L-shaped lever 126 is pivotally mounted on a pivot pin 127 embedded in the lower chassis. An idler gear 128 is pivotally mounted on the pivot pin 127 and is engaged with an idler gear 129 which is rotatably mounted on the lower chassis. The idler gear 129 is engaged with a gear 69. An FF idler gear 130 and an REW idler gear 131 are rotatably provided on the L-shaped lever 126. These idler gears 128, 130 and 131 are engaged with one another in the stated order.

Figure 21:
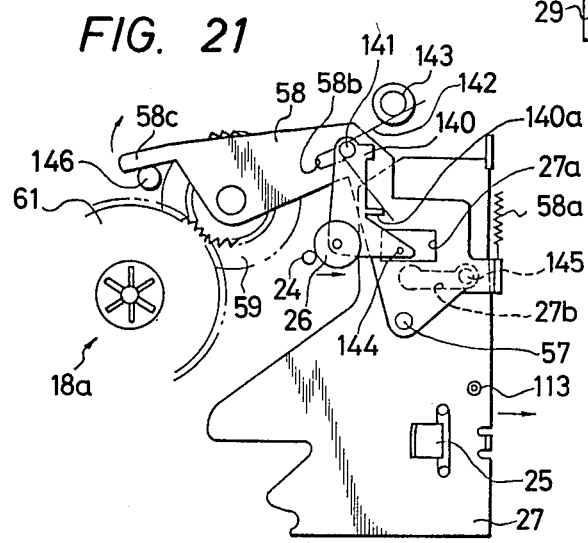
FIG. 21 shows a mechanism for actuating a pinch roller and its associated arm.

As shown in FIG. 21, a pinch roller arm 140, on which a pinch roller 26 is rotatably mounted, is pivotally mounted on a pivot pin 141 embedded in the lower frame. A coil spring 142 is wound on the pivot pin 141. One end of the coil spring 142 abuts against a column 143 embedded in the lower frame, while the other end abuts against a protrusion 140a of the pinch roller arm 140, so that the pinch roller arm 140 is urged towards the capstan 24. A pin 144 is embedded in the lower surface of the pinch roller arm 140, and is inserted into a small window 27a formed in the head 27. The above-described turning arm 58 is disposed between the head 27 and the pinch roller arm 140, and is pivotally mounted on a pivot pin 57 embedded in the lower frame (not shown). The pivot pin 141 is inserted into the elongated hole 58b of the arm 58. A cam follower pin 145 extends from the arm 58 towards the head 27 and is engaged with a U-shaped cam hole 27b cut in the head 27. The turning arm 58 has a protrusion 58c which abuts against a stopper pin 146 embedded in the lower frame.

Figure 22:
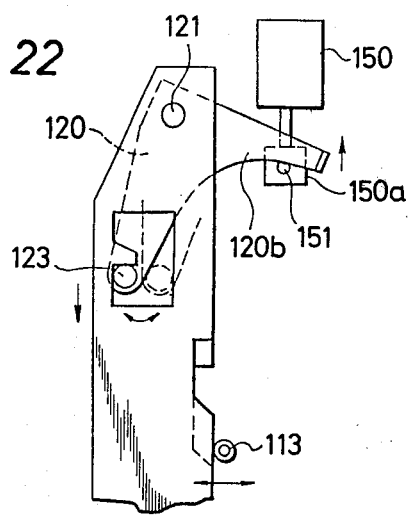
FIG. 22 is a diagram for describing the operation of the FF and REW lock arms.

FIG. 22 shows one example of a music selection mechanism. The protruded end portion 120b of the lock arm 120 is engaged with a control member 151 which is coupled to the plunger 150a of a music selection solenoid 150. When the beginning of music is detected during the music selecting operation, the music selection solenoid 150 is excited to turn the lock arm 210 counter-clockwise.

Now, the operations of the reel unit drive mechanism, the sensing mechanism with the planet gear, and the head forwarding mechanism, which are arranged as described above, will be described.

When a cassette is loaded, the motor is driven to rotate the pulley 51 in the direction of the arrow in FIG. 12. Therefore, the reel unit drive gear 61 coupled to the reel unit 18a is turned in the direction of the arrow. In this case, the head is at the rear position, and the ratchet arm 65 is positioned as shown in FIG. 12 so as to allow the ratchet gear 63 to turn clockwise only. Therefore, the tape is stretched tight, whereupon the reel unit 18a is stopped and the torque applied via friction to the sensing releasing arm 62 is eliminated.

On the other hand, torque is applied to the planet gear unit through the belt 55, the pulley 53 and the idler gears 70 and 71, so that the internal gear member 75 is turned in the direction of the arrow in FIG. 13. Therefore, when the torque imparted to the sensing releasing arm 62 is eliminated, the sensing releasing arm 62 and the Y-shaped arm 83 are stopped at the positions indicated by the broken lines in FIG. 13. As a result, the pin 75c or 75d of the internal gear member 75 abuts against the end portion 83a of the Y-shaped arm 83, so that the rotation of the internal gear member 75 is stopped. Since the sun gear 73b still turns, the carrier member 77 carrying the planet gears 76a, 76b and 76c is turned, and the torque of the carrier member 77 is transmitted through the carrier gear 77a, the idler gears 78 and 79 and the gear 80a to the power sensing gear member 80, so that the latter is turned in the direction of the arrow in FIG. 14 or 16. Accordingly, the slide members 85 and 86 are pushed in the directions of the arrows by the rollers 81a and 81b, respectively. In response to the movement of the slide member 86, a start signal is applied to the automatic ejection mechanism; however, in this case, an ejection operation is not carried out (the automatic ejection mechanism will be described later). As the slide member 85 is moved, the locking lever 95 is also moved in the same direction simultaneously, and the locking pawl 95a is engaged with the locking pawl 97a of the key off lock lever 97. Therefore, as the slide member 85 is moved, the key off lock lever 97 is moved towards the head. Since the key off lock lever 97 is elastically coupled to the head drive lever 98 through the spring 100, the head drive lever 98 is moved towards the head and the head 27 is advanced in the direction of the arrow in FIG. 19. When the head 27 is advanced to a certain position, the locking pawl 115 of the head pulling and retaining arm 105 abuts against the pin 108 to temporarily stop the head. However, as the movement of the slide member 85 is continued, the pin 88 abuts against the head pulling and retaining arm 105 to turn the arm 105 clockwise as shown in FIG. 19a thereby to disengage the locking pawl 115 from the pin 108. In this operation, the spring 100 is pulled by the temporary stop of the head 27 and accordingly by the temporary stop of the head drive arm 98. Therefore, the head drive arm 98 is moved quickly towards the head, by the restoring force of the spring 100, and simultaneously the head 27 is moved quickly to the forward position. At the same time, the key off lock lever 97 is moved to the position indicated by the broken line in FIG. 17, so that the pin 101 engages the key off lock arm 102 and the key off lock lever 97 is locked thereby.

When the roller 81a or 81b pushing the slide member 85 reaches the dead point, it is disengaged from the slide member 85 and therefore the latter 85 is restored by the restoring force of the spring 96, whereupon the pin 96b of the locking lever 95 is pushed by the cam hole 99 of the head drive lever 98, so that the locking lever 95 is turned clockwise in FIG. 17 against the spring 96.

As the head stand 27 is advanced, the ratchet arm 65 which has stopped the reverse movement of the ratchet gear 63 is turned counterclockwise in FIG. 12 to permit reverse rotation of the ratchet gear 63, as a result of which the reel unit 18b can turn freely. Thus, the cassette deck is placed in the playback state.

When the tape has run to its end, the rotation of the reel unit 18a is stopped, and similarly as in the above-described tape tightening or stretching operation, the power sensing gear member 80 starts rotation and the slide member 85 is pushed towards the head. In this operation, the locking lever 95 is turned clockwise in FIG. 17 by the cam hole 99 of the head stand drive lever 98, and the pin 95c of the locking lever 95 is fitted in the latching portion 92aa of the cam hole 92a of the latch lever 92. On the other hand, in this operation, the slide member 86 is pushed to actuate the automatic ejection mechanism. Therefore, the key off solenoid 104 is deenergized to release the locking of the key off lock arm 102 and to restore the key off lock lever 97, and the head stand drive lever is also restored to retract the head 27. In this case, as the locking lever 95 is latched by the latch lever 92, the collision of the locking pawl 95a with the locking pawl 97a of the key off lock lever 97 is avoided.

Now, the fast-forwarding (FF) and rewinding (REW) operations will be described.

Figure 23A:
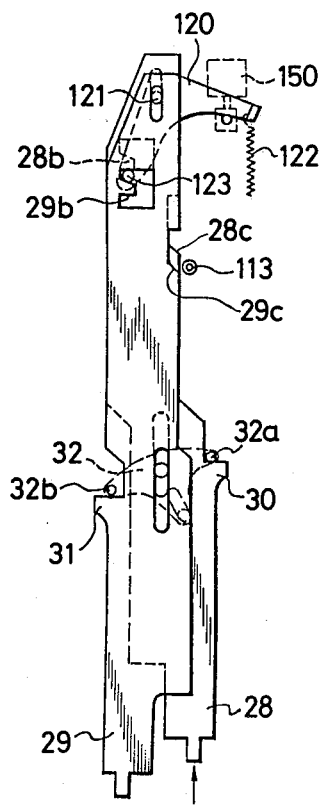
FIGS. 23a, 23b, 24a and 24b are diagrams for describing the operation of the FF and REW levers.
Figure 23B:
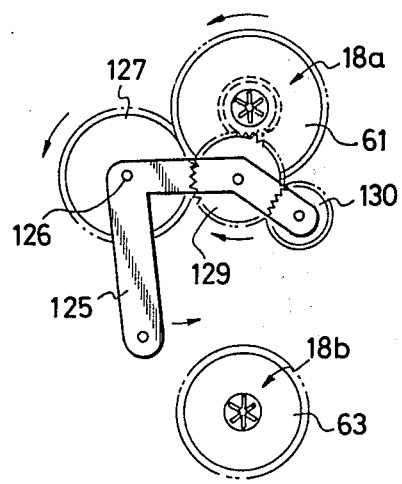

When the FF lever 28 is operated during the playback operation of the tape deck with a cassette loaded, as shown in FIG. 23a, the protrusion 28b of the FF lever 28 engages the roller 123 of the lock arm 120 to lock the FF lever 28 at the lock position, while the cam 28c pushes the pin 113 to the right in the figure so that the head 27 is moved slightly backward to the music selection position. Simultaneously, when the pinch roller 24 is retracted to leave the capstan 26, the head member 25 is caused to lightly contact the tape. In this operation, the cam follower pin 145 is pushed downwardly in FIG. 21 by the central protrusion of the U-shaped cam hole 27b of the head stand 27, so that the turning arm 58 is turned clockwise in the figure to disengage the reel unit drive gear 61 from the idler gear. On the other hand, the second arm 32 is turned counterclockwise in FIG. 23a by the operation of the FF lever 28 and the L-shaped lever 125 is turned counterclockwise as shown in FIG. 23b. As a result, the FF idler gear 129 is engaged with the reel unit drive gear 61, so that the high speed rotation torque is transmitted to the reel unit drive gear 61. Thus, the fast forward operation of the tape deck is carried out.

In order to stop the fast forward operation, the REW lever 29 is lightly operated. Thereupon, the roller 123 is disengaged from the protrusion 28b, and the FF lever 28 is restored. Thus, the cassette deck is placed in the playback state again.

When the tape is run to the end during the fast forwarding operation, the power sensing gear member 80 of the reel unit rotation stop sensing mechanism is turned, so that the slide member 85 is moved to cause the pin 88 to push the head pulling and retaining arm 105 as shown in FIG. 19a. Therefore, the end portion 105c of the arm 105 pushes one end portion 120a of the lock arm 120 to turn the latter counterclockwise thereby to unlock the FF lever 28. Thus, the tape deck is placed in the playback state again.

Figure 24A:
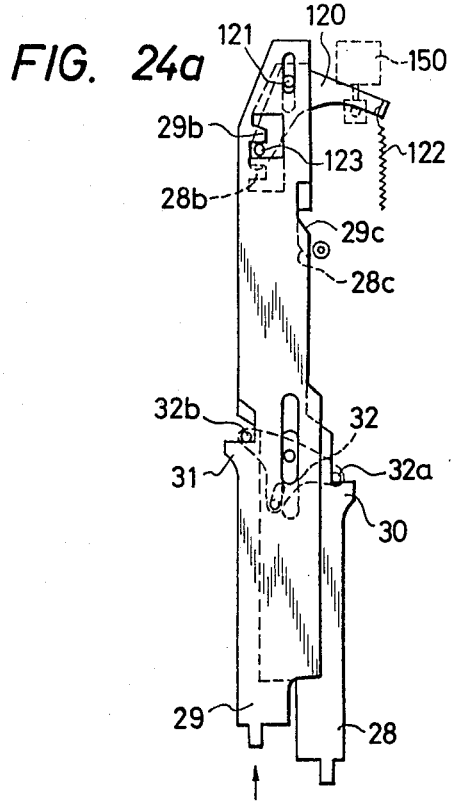
Figure 24B:
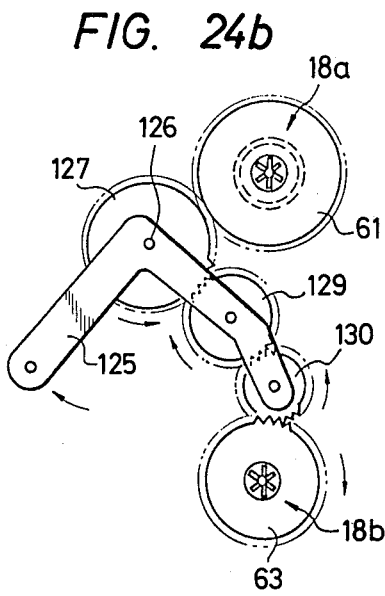

In order to start the rewinding operation, the REW lever 29 is pushed strongly. In this case, the REW lever 29 is locked at the operating position by the lock arm 120 as shown in FIG. 24a. Therefore, the pin 113 is pushed in the direction of the arrow by the cam 29c, so that the head 27 is moved slightly backward and the idler gear 59 (FIG. 21) leaves the reel unit drive gear 61. At the same time, as shown in FIG. 24b, the REW idler gear 130 is engaged with the reel unit drive gear 63 to rotate the reel unit 18b. Thus, the rewinding operation is carried out.

When the music selection mechanism is operated to carry out music start detection during the fast forwarding operation or the rewinding operation, the music selection solenoid 150 is energized to turn the lock arm 120, as a result of which the FF lever 28 or the REW lever 29 is restored, so that the playback operation is effected to play the desired music.

Figure 25:
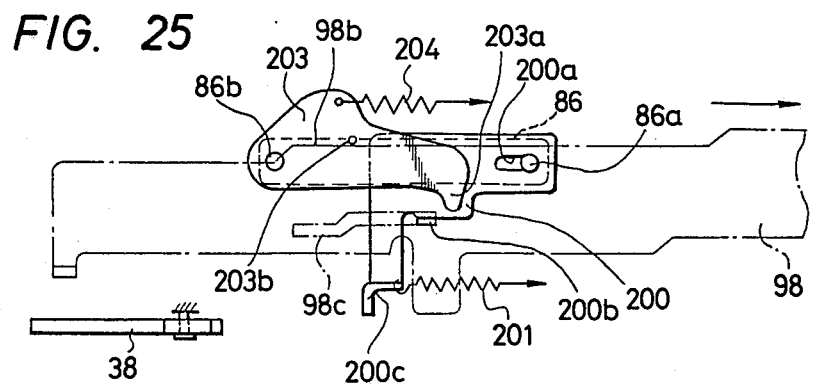
FIG. 25 is a schematic plan view showing one example of an automatic ejection mechanism.
Figure 26:
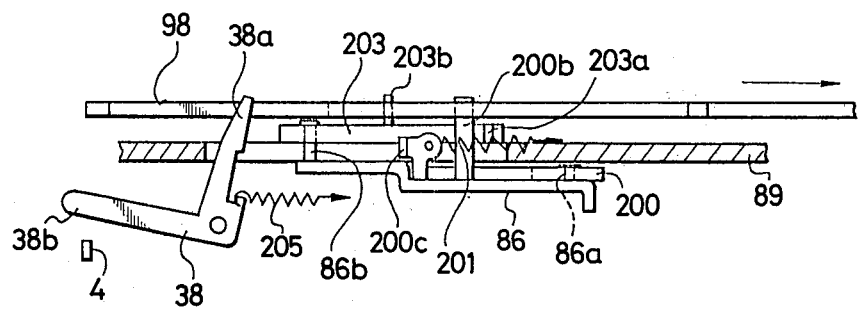
FIG. 26 is a side view, partly in section, showing the automatic ejection mechanism of FIG. 25.

FIG. 25 is a plan view of one example of the automatic ejection mechanism, and FIG. 26 is a side view, partly as a sectional view, of the same. Since the cassette deck of the invention is so designed that it carries out reproduction only when a tape runs in one direction, the automatic ejection mechanism is used to automatically eject the cassette when the tape end is detected during the playback operation or the fast forwarding operation. In FIGS. 25 and 26, the slide member 86 is driven to the left by the power sensing gear 80 (FIG. 16) when the rotation of the reel is stopped, i.e., when the tape end is detected, as was described with reference to FIG. 16. A substantially L-shaped start lever 200 is provided on the slide member 86. The lever 200 has an elongated hole 200a having a predetermined length at one end portion. The pin 86a embedded in the slide member 86 is inserted into the elongated hole 200a, so that the lever 200 is slidable relative to the slide member within the length of the elongated hole 200a. The lever 200 is urged to turn counterclockwise about the pin 86a by a spring 201.

An ejection power arm 203 with a hook 203a, which is engageable with the protrusion 200b of the start lever 200, is slidably provided on the chassis member 89. The ejection power arm 203 is pivotally mounted on a shaft 86b embedded in the slide member 86 and is urged clockwise in FIG. 25 by a spring 204. The start lever 200 is engaged through a pin 203b with the cam 98b of the above-described head stand drive lever 98. The head stand drive lever 98 has a cam hole 98c into which the protrusion 200b of the start lever 200 is inserted. As the lever 200 is urged to turn about the pin by the spring 201 as described above, the protrusion 200b is pushed against the cam surface of the cam hole 98c.

When the head is moved forward, the head drive lever 98 is moved to the right in the figure to disengage its cam 98b from the pin 203b of the ejection power arm 203. As a result, the ejection power arm 203 is turned to the position by the spring 204 where the hook 203a can engage the protrusion 200b of the start lever 200. When the tape end is detected during the playback operation, in which the head is maintained at the forward position, the slide member 86 is moved in the direction as shown in figure by the power sensing gear member 80 (FIG. 16). Thereupon, the ejection power arm 203 is operated through the pin 86b, and the hook 203a of the ejection power arm 203 drives the start lever 200 through the protrusion 200b. Therefore, the lever 200 is moved together with the slide member 86. As the protrusion 200b is moved along the cam surface of the cam hole 98c of the head drive lever 98, the upright portion 200c of the start lever 200 is moved to the position where it can engage the end portion 38a of the lock release lever 38. When the upright portion 200c comes near the left dead point, it engages one end portion 38a of the lock release lever 38 to turn the latter. The following operations are completely similar to those in the above-described manual ejection.

Figure 27A:
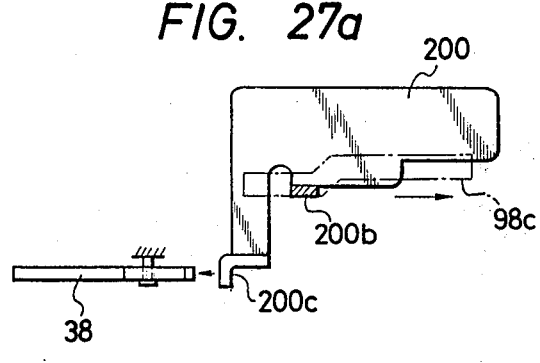
FIGS. 27a and 27b are diagrams for describing the operation of the mechanism shown in FIG. 25.
Figure 27B:
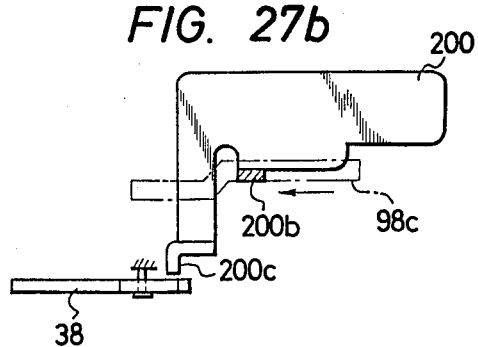

When the cassette is ejected as described above, the aforementioned key off solenoid 104 (FIG. 17) is deenergized (off) in association with the ejection mechanism. Therefore, the head drive lever 98 is unlocked and restored as shown in FIG. 25. When the lever 98 is restored, the protrusion 200b of the start lever 200 is moved along the cam surface as shown in FIG. 27b as the cam hole 98c of the lever 98 is moved. Therefore, the upright portion 200c of the start lever 200 is immediately retracted from the path along which the end portion 38a of the lock release lever 38 is turned. Accordingly, even if for instance, an interruption in the power supply occurs immediately after the lock release lever has been operated, the lock release lever 38 can be restored by the spring 205, so that the next cassette is smoothly loaded.

On the other hand, when the head is maintained at the rear position, i.e., during the fast forwarding operation or the rewinding operation, or when the cassette is loaded, the head drive lever 98 is positioned as shown in FIG. 25. Therefore, the ejection power arm 203 is brought to the position by the engagement of the cam 98b and the pin 203b, where the hook 203a cannot engage with the protrusion 203b of the start lever 200. When, under this condition, the slide member 86 is moved to the left in the figure upon detection of the tape end, the ejection power arm 203 is operated through the pin 86b. At the same time, the pin 86a is moved along the elongated hole 200a of the lever 200 to abut against the left end of the elongated hole, thereby to move the lever 200 to the left in figure. In this case, the stroke of the lever 200 becomes shorter by the length of the elongated holes 200a than the stroke of the slide member 86, so that the upright portion 200c of the lever 200 does not abut against the end portion 38a of the lock release lever 38. Therefore, ejection is not carried out. When the slide member 86 is positioned at the left dead point, the ejection power arm 203 can be turned clockwise because its pin 203b is disengaged from the cam 98b of the head stand drive lever 98; however, the rotation of the arm 203 is restricted as the hook 203a abuts against the upper surface (in FIG. 25) of the protrusion 200b of the lever 200, thus preventing the hook 203a from being caught by the left side of the protrusion 200b of the lever 200 during the restoring operation.

FIG. 28 is a side view of one example of a door retaining mechanism. An opening 206a is formed in the front panel 206 of the cassette deck, through which a cassette 15 is loaded and unloaded. A door 207 for covering the opening 206a is rotatably mounted on a shaft 207a provided on the rear side of the front panel 206. The door 207 is urged clockwise in the figure by a means not shown. The door 207 is turned counterclockwise by the cassette when the latter is loaded through the opening 206a.

On the other hand, a door retaining lever 208 is provided to push the door 207 below the path of movement of the cassette and maintain it there when the cassette is loaded. The door retaining lever 208 is rotatably mounted on a shaft 209 embedded in a side frame 1. The door retaining lever 208 has an inverted-V-shaped cam 208a which is engageable with a portion of a pin 2b on a cassette pushing lever 2, the portion of the pin 2b being protruded on the rear side of the side frame 1. In loading the cassette, the cassette pushing lever 2 is moved to the left in the figure by the cassette 15 and the pin 2b is moved while pressing the cam 208a, and therefore the door retaining lever 208 is turned clockwise to push the edge of the door 207 which has been turned to a predetermined position by the cassette half 15, so that the door 207 is positioned as indicated by the one-dot chain line in FIG. 28.

In ejecting the cassette, the cassette pushing lever 2 is restored while ejecting the cassette. Therefore, the door retaining lever 208 is turned counterclockwise while pushing the door 207 and releases the door 207 when the cassette is pushed out of the opening 206a by a predetermined length. The door 207 thus released abuts against the main surface 15a of the cassette and closes the opening 206a in association with the movement of the cassette. The door retaining lever 208 releases the door 207 when the cassette protrudes out of the opening 206a by the predetermined length, as described above, which eliminates the problem where the edge of the door 207 engages the step of the protrusion 15c on the main surface 15a of the cassette to obstruct ejection.

In the case where ejection is carried out manually, the FF lever 28 and the REW lever are depressed simultaneously as was described before. In this case, the two levers 28 and 28 are not locked by the roller 123 provided on the end portion of the lock arm 120 (FIGS. 20 or 22); none of the levers are locked, due to the following reason: As shown in FIG. 29, another movement controlling lever 210 for controlling the amount of movement is coupled to the pin 34 which is secured to the second arm 32 and the first cam 33, and the pin 211 embedded in the chassis member (not shown) is inserted into an elongated hole 201a formed in the lever 210. The control lever 210 is arranged in parallel with the FF lever 28 and the REW lever 29, and is reciprocated in the direction of the arrow together with the second arm 32, so as to restrict the amount of movement of the second arm 32, and accordingly the pin 34, within the range of a distance d shown in FIG. 30. FIG. 30 schematically shows the positional relationships between the second arm 52 and the pins 32a, 32b and 34. In FIG. 30, the case where only the REW lever 29 is depressed is indicated by the solid line, and the case where both the FF lever 28 and the REW lever 29 are depressed simultaneously is indicated by the dotted line. As is apparent from FIG. 30, the amount of movement of the pin 34 in the case where the two levers 28 and 29 are depressed at the same time is larger than the amount of movement of the pin 34 in the case where only one of the levers is depressed; however, the amount of movement of the pins 32a and 32b in the former case is smaller than that in the latter case. Therefore, when both the levers 28 and 29 are depressed simultaneously, the ejection instruction is issued, but nether of the levers 28 and 29 are locked.

As is apparent from the above description, with the head drive mechanism according to the invention, the head, after moving forward slowly, stops once and then moves forward quickly, so that the abutment of the pinch roller against the capstan and the supply reel ratchet release are achieved in a very short time. Therefore, no problems due to irregular timing are caused.

What is claimed is:

1. A head drive mechanism for a cassette deck, comprising:
   a movable member which, when rotation of a reel unit is stopped, is reciprocated by the drive of a drive motor for said reel unit;
   a head drive lever which is coupled to a head, for advancing said head when driven;
   an operating member which is operated in association with the reciprocation of said movable member;
   an elastic member which elastically couples said operating member to said head drive memeber; and
   locking means for locking said head when said head is advanced a predetermined distance and for unlocking said head and advancing said head quickly when said movable member reciprocates over a predetermined distance.

2. A head drive mechanism for a cassette deck comprising:
  a movable member reciprocatingly moving when a reel unit is prevented from rotating;
  cooperating means moving together with a head carrying head plate for advancing the head plate;
  an engagement member engageable with said cooperating means when said movable member is reciprocatingly moved to an engagement angular position, said engagement member being rotatably supported by said movable member; and
  latch means for retaining said engagement member at a disengaged angular position when said head plate is in its forward position.

3. The mechanism of claim 2, wherein said cooperating means includes a head plate advancing arm engaged at one end with said head plate, and a reciprocable head plate drive lever engaged with the other end of said head plate advancing arm.

4. The mechanism of claim 3, wherein said latch means includes cam holes formed in said head plate drive lever; a first cam follower member engaged with said cam hole and fixed to said engagement member; a second cam follower member fixed to said engagement member; and a latch member biased in the reciprocating direction of said head plate drive lever and having a cam hole for engagement with said second cam follower member, for retaining said engagement member at the disengaged angular position when said head plate drive lever commences the reciprocating movement under the condition where said engagement member is in the disengaged angular position.

5. The mechanism of claim 1, further comprising planetary gearing means driven by said drive motor and including a sun gear driving a carrier through planet gears when rotation of a reel unit is stopped, transfer gear means receiving an output of said carrier, and a power gear driven by said transfer gear means for reciprocating driving said movable member.

6. The mechanism of claim 4, said engagement member comprising a locking member having a locking pawl, said pawl being engaged with a portion of a lock lever (97), whereby said lock lever is reciprocated as said movable member reciprocates.

7. The mechanism of claim 6, said lock lever being elastically coupled to said head plate drive lever through spring means.

8. The mechanism of claim 7, including a head pulling and retaining arm associated with said head plate drive lever.

9. The mechanism of claim 8, said head pulling and retaining arm including pawl means for halting the advance of said head at a predetermined position, said pawl means being releasable to permit said head to continue advancement at a relatively high speed.

10. The mechanism of claim 9, said movable member including means for engaging said pulling and retaining arm to release said pawl means.

11. The mechanism of claim 8, wherein, during said halting, said spring means is stretched, whereby, when said pawl means is released, said head is quickly advanced by the restoring force of said spring means.

12. The mechanism of claim 1, said movable member comprising a reciprocatingly moving member driven by gearing means of said tape deck, said movable member engaging said locking means near an end of the reciprocating movement thereof, to unlock said head.

13. The mechanism of claim 1 or 12, said elastic member comprising spring means, said spring means being stretched when said head is locked, and applying a restoring force to said head when said head is released, so as to advance said head quickly.

14. The mechanism of claim 1 or 12, said operating member including an engagement member comprising a locking member including means for engaging a lock lever, said engagement member and said locking member being reciprocable with said movable member.

15. The mechanism of claim 14, said operating member further including a reciprocable head drive lever associated with said head drive lever for driving said drive lever when reciprocated, except when said locking means temporarily locks said head.

* * * * *